(12) United States Patent
Mabuchi

(10) Patent No.: US 7,860,458 B2
(45) Date of Patent: Dec. 28, 2010

(54) AUDIO TRANSMITTING APPARATUS AND MOBILE COMMUNICATION TERMINAL

(75) Inventor: Toru Mabuchi, Oume (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 757 days.

(21) Appl. No.: 11/714,387

(22) Filed: Mar. 6, 2007

(65) Prior Publication Data

US 2008/0119239 A1 May 22, 2008

(30) Foreign Application Priority Data

Nov. 21, 2006 (JP) ............................ P2006-314262

(51) Int. Cl.
*H04B 7/00* (2006.01)
(52) U.S. Cl. .................... 455/41.2; 455/3.06; 455/66.1; 381/74
(58) Field of Classification Search .............. 455/569.1, 455/3.06, 41.1, 41.2, 66.1, 455, 556.1, 575.2, 455/343.5; 381/74, 334, 374, 370, 381, 375, 381/311; 700/94
See application file for complete search history.

(56) References Cited

U.S. PATENT DOCUMENTS

| | | | | |
|---|---|---|---|---|
| 5,097,364 | A * | 3/1992 | Goto et al. ..................... | 360/32 |
| 6,978,242 | B2 * | 12/2005 | Hamada ..................... | 704/503 |
| 7,046,999 | B2 * | 5/2006 | Wu et al. ..................... | 455/420 |
| 2002/0039424 | A1 * | 4/2002 | Watanuki ..................... | 381/74 |
| 2002/0045438 | A1 * | 4/2002 | Tagawa et al. ............... | 455/412 |
| 2004/0120530 | A1 * | 6/2004 | Sapashe et al. ................ | 381/58 |
| 2006/0109870 | A1 * | 5/2006 | Miyaji et al. ................. | 370/537 |
| 2007/0055497 | A1 * | 3/2007 | Kimijima et al. .......... | 704/200.1 |
| 2007/0061409 | A1 * | 3/2007 | Rydenhag .................... | 709/217 |
| 2007/0177620 | A1 * | 8/2007 | Ohmuro et al. ............. | 370/412 |
| 2008/0123864 | A1 * | 5/2008 | Reichelt et al. ................ | 381/1 |

FOREIGN PATENT DOCUMENTS

JP 2003-309541 A 10/2003
WO WO 2004/034350 * 4/2004

* cited by examiner

*Primary Examiner*—Kamran Afshar
*Assistant Examiner*—Marisol Fahnert
(74) *Attorney, Agent, or Firm*—Holtz, Holtz, Goodman & Chick, PC

(57) ABSTRACT

An audio transmitting apparatus connectable to an audio playing apparatus via a short distance wireless communication network includes: a transmission buffer configured to store an audio signal; and a short distance wireless transmitting unit configured to cause the audio signal to be stored in the transmission buffer, or transmit the audio signal stored in the transmission buffer to the audio playing apparatus. When a transmission process in which the audio signal is transmitted to the audio playing apparatus by the short distance wireless transmitting unit is interrupted, the short distance wireless transmitting unit corrects the audio signal and stores the corrected audio signal in the transmission buffer, or corrects the audio signal stored in the transmission buffer and transmits the corrected audio signal to the audio playing apparatus.

15 Claims, 6 Drawing Sheets

AUDIO TRANSMITTING APPARATUS AND MOBILE COMMUNICATION TERMINAL

CROSS-REFERENCE TO RELATED APPLICATIONS

This application is based on and claims the benefit of priority from the prior Japanese Patent Application No. 2006-314262, filed on Nov. 21, 2006; the entire contents of which are incorporated herein by reference.

BACKGROUND

1. Technical Field

The present invention relates to mobile terminal such as an audio transmitting apparatus and a mobile communication terminal with a function to warn a user before occurring difficulties in transmission during transmitting voice and/or music data.

2. Description of Related Art

Audio signals are transmitted via short distance wireless links in either a bidirectional manner or a one directional manner between audio transmitting apparatuses such as a mobile communication terminal and a music player, and audio receiving apparatuses such as a hand-free telephone communication apparatus and a headset. In this case, audio data to be transmitted may include voice data, and/or music data. Also, as the communication method, for instance, a Bluetooth technique is employed.

This type of communication has vulnerability to deteriorations of communication qualities. That is, sound to be transmitted will be interrupted during transmission. For instance, a metal product is interposed between an audio 1, transmitting apparatus and an audio receiving apparatus, so that electromagnetic waves are shielded, or reflected by the metal product.

Accordingly, the below-mentioned operations are known. When a deterioration of a communication quality of a short distance wireless communication network is detected, since a compression ratio of the audio data be to transmitted is increased, a use efficiency of a buffer is increased so as to establish a margin capable of resending audio signals, so that sound interruptions hardly occur (refer to, for example, JP-A-2003-309541 (pages 2 to 3, FIG. 9).

When the above-described metal product corresponds to an article owned by a user of an apparatus and is moved based upon the will of the user, the user may furthermore move this metal product, so that the communication quality of the short distance wireless communication may be improved. On the other hand, a user may improve the communication quality of the short distance wireless communication network by moving either the audio transmitting apparatus and/or the audio receiving apparatus irrespective of such a fact as to whether or not the above-described metal product belongs to the article owned by the user, namely, whether or not the movement of the metal product is caused by the will of the user.

Also, in the case that an audio transmitting apparatus is arranged by a CPU and programs which are utilized by the CPU, such a possibility that the above-explained communication may be interrupted is not equal to zero, since a large number of these programs are executed in the audio transmitting apparatus, so that the CPU resources allocated to the short distance wireless communication process operation become insufficient.

The reason is given as follows: That is, since both audio transmitting apparatuses and audio receiving apparatuses are portable type apparatuses operated by electric power stored in batteries, it is important to reduce power consumption thereof. It is proper to design these audio transmitting apparatuses and audio receiving apparatuses in that CPUs which consume minimum necessary power are mounted thereon, namely CPUs having minimum required performance are mounted thereon.

When the CPU resources become insufficient, the user may operate to reduce loads given to the CPU, which are caused by either one program or plural programs under execution, so that the possibilities in which the communication is interrupted may be eliminated, or may be reduced.

However, in accordance with the method disclosed in JP-A-2003-309541, it is possible to delay that the communication is interrupted, but it is not always possible to avoid that the communication is interrupted. In the case that the communication quality of the short distance wireless communication network cannot be improved for a time duration longer than, or equal to a predetermined time duration, the above-explained method has the following problems. That is, a sound interruption happens to occur, so that unpleasant feelings are given to the user, or understandings of telephone communications are disturbed.

SUMMARY

According to an aspect of the invention, there are provided an audio transmitting apparatus and a mobile communication terminal, which notify such a possibility that an audio communication is interrupted by sounds communicated by the audio communication. In accordance with the above-described process operation, a user of the audio transmitting apparatus and/or the mobile communication terminal can have the possibility of the above-described sound interruption by merely listening to the communicated sound, but may not pay his attention to other aspects, for example, a display of a notification.

DESCRIPTION OF THE EMBODIMENT

Figure 1:
FIG. 1 is an exemplary block diagram for showing an arrangement of an audio communication system in which a mobile communication terminal according to an embodiment of the invention apparatus is included.

Referring now to drawings, an embodiment of an audio transmitting apparatus according to the present invention will be described. FIG. 1 is a block diagram for indicating an arrangement of an audio communication system including a mobile communication terminal to which the audio transmitting apparatus has been applied.

The audio communication system is arranged by a mobile communication apparatus 10, a hand-free apparatus 30, and a short distance wireless link 40. The mobile communication terminal 10 is connected to a mobile communication network. The short distance wireless link 40 is to connect the mobile communication terminal 10 to the hand-free apparatus 30.

Figure 2:
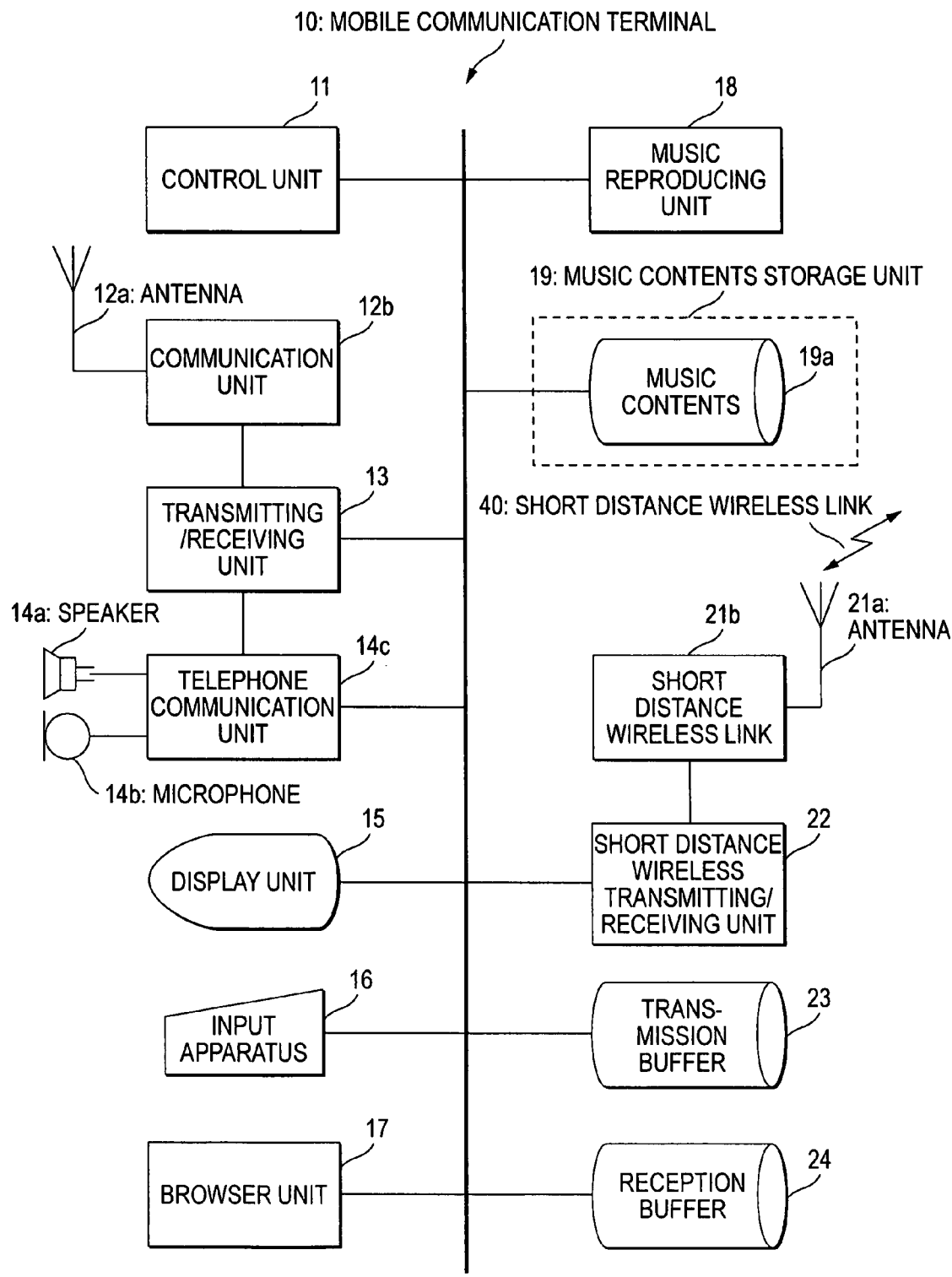
FIG. 2 is an exemplary block diagram for representing an arrangement of the mobile communication terminal apparatus according to the embodiment.

FIG. 2 is a block diagram for representing an internal arrangement of the mobile communication terminal 10. The mobile communication terminal 10 is arranged by a control unit 11, an antenna 12a, a communication unit 12b, a transmitting/receiving unit 13, a speaker 14a, a microphone 14b, a telephone communication unit 14c, a display unit 15, an input apparatus 16, a browser unit 17, a music reproducing unit 18, a music contents storage unit 19, another antenna 21a, a short distance wireless link 21b, a short distance wireless transmitting/receiving unit 22, a transmission buffer 23, and also, a reception buffer 24. The control unit 1 controls the entire units of the mobile communication terminal apparatus 10. The antenna 12a transmits and receives electromagnetic waves between the own mobile communications terminal 10 and abase station (not shown) belonging to the mobile communication network. The speaker 14a is mainly employed in a telephone receiving operation. The microphone 14b is mainly employed in a telephone transmitting operation. The display unit 15 provides information to a user. The input apparatus 16 is used to input an operation instruction from the user. The antenna 21a transmits and receives electromagnetic waves of a short distance wireless communication operation.

Music contents 19a are stored in the music contents storage unit 19. The music contents 19a may be received from a contents server (not shown) via the base station and the communication unit 12b, or may be acquired via a memory card, and correspond to such contents which are reproduced by the music reproducing unit 18. Both an audio signal and a music signal (will be simply referred to as "audio signal" hereinafter) are stored in the transmission buffer 23, which are transmitted to the hand-free apparatus 30 by the short distance wireless transmitting/receiving unit 22. An audio signal which is transmitted from the hand-free apparatus 30 and received by the short distance wireless transmitting/receiving unit 22 is stored in the reception buffer 24.

Figure 3:
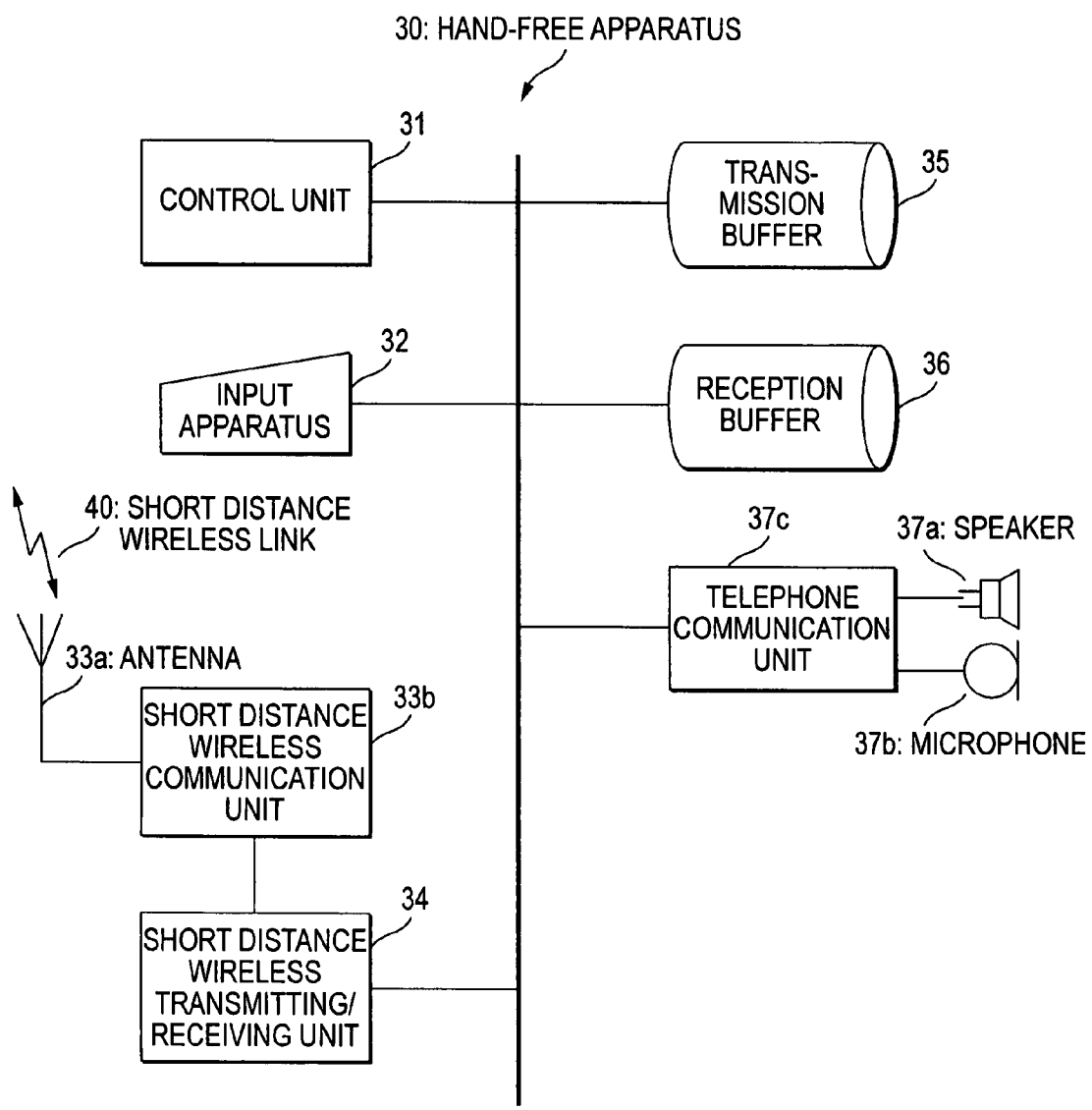
FIG. 3 is an exemplary block diagram for an arrangement of a hand-free apparatus of the audio communication system according to the embodiment.

FIG. 3 is a block diagram for showing an internal arrangement of the hand-free apparatus 30. The hand-free apparatus 30 is arranged by an antenna 33a for transmitting and receiving electromagnetic waves of a short distance wireless communication, a short distance wireless communication unit 33b, a short distance wireless transmitting/receiving unit 34, a transmission buffer 35, a reception buffer 36, a speaker 37a employed so as to hear music and to receive a telephone communication, a microphone 37b employed in order to transmit voice, and a telephone communication unit 37c.

An audio signal is stored in the transmission buffer 35, which is transmitted by the short distance wireless transmitting/receiving unit 34 to the mobile communication terminal apparatus 10. An audio signal which is transmitted from the mobile communication terminal 10 and received by the short distance wireless transmitting/receiving unit 34 is stored in the reception buffer 36.

At least portions of the control unit 31, and the short distance wireless transmitting/receiving unit 34 are configured by a CPU and a program which is used by the CPU. Then, the control unit 31 performs at least are source management function of the OS (Operating System).

Referring now to FIG. 1 to FIG. 3, a description is made of operations as to the respective units of the audio communication system according to the embodiment, which is arranged as explained in the above drawings.

Firstly, the operations as to the respective units of the mobile communication terminal 10 will now be explained with reference to FIG. 2. The communication unit 12b transmits a high frequency signal received via the antenna 12 to the transmitting/receiving unit 13. Also, a high frequency signal outputted from the transmitting/receiving unit 13 is transmitted to the antenna 12a.

The transmitting/receiving unit 13 amplifies, frequency-converts, and demodulates a high frequency signal supplied from the communication unit 12b, and outputs a digital audio signal to either the telephone communication unit 14c or the short distance wireless transmitting/receiving unit 22, and also, transmits a control signal to the control unit 11. Furthermore, the transmitting/receiving unit 13 modulates, frequency-converts, and amplifies a digital audio signal outputted from either the telephone communication unit 14c or the short distance wireless transmitting/receiving unit 22, and also, a control signal outputted from the control unit 11 so as to obtain a high frequency signal, and then, transmits the obtained high frequency signal to the communication unit 12b.

The telephone communication unit 14c converts the digital audio signal outputted from the transmitting/receiving unit 13 into an analog audio signal, and amplifies the converted analog audio signal to supply the amplified analog audio signal to the speaker 14a. Also, the telephone communication unit 14c amplifies an analog audio signal outputted by the microphone 14b, and converts the amplified analog audio signal into a digital audio signal, and then, transmits the converted digital audio signal to the transmitting/receiving unit 13.

The display unit 15 is, for instance, such a display unit constructed of an LCD (Liquid Crystal Display), and commences a display operation by being initiated by the control unit 11. The display unit 15 continuously performs the same display operation until a new screen is initiated by the control unit 11 in response to an input signal issued from the input apparatus 16, or depending upon operations of the browser unit 17 and the music reproducing unit 18.

The input apparatus 16 is composed of a plurality of key switches, and notifies a code signal to the control unit 11 in response to an initiation signal issued from the control unit 11, while the code signal identifies a key switch manipulated by the user.

The browser unit 17 is initiated by a predetermined key operation of the input apparatus 16, and accesses a Web site via the transmitting/receiving unit 13, the communication unit 12b, and the base station. Then, the browser unit 17 displays characters, a still image, or a moving picture on the display unit 15, which are transmitted from the accessed Web site.

The music reproducing unit 18 is initiated by a predetermined key operation of the input apparatus 16, and reads out a music content 19a stored in the music contents storage unit 19 so as to produce an audio signal. In this case, when the music content 19a has been encoded, the music reproducing unit 18 decodes the music contents 19a.

Then, the music reproducing unit 18 sends the formed audio signal to the speaker 14a so as to produce audios, or sends the formed audio signal to the short distance wireless transmitting/receiving unit 22. Also, while the mobile communication terminal 10 includes a music reproducing-purpose second speaker (not shown), the music reproducing unit 18 may alternatively send the formed audio signal to the second speaker so as to produce music.

Next, the short distance wireless communication unit 21b transmits a short distance wireless high frequency signal received from the short distance wireless link 40 via the antenna 21a to the short distance wireless transmitting/receiving unit 22. Also, the short distance wireless communication unit 21b transmits a high frequency signal outputted from the short distance wireless transmitting/receiving unit 22 to the short distance wireless communication network 40 via the antenna 21a. In the example, as the short distance wireless communication, for instance, the Bluetooth technique is employed, but the embodiment is not limited thereto. Alternatively, a wireless LAN technique may be employed, or an infrared communication technique may be employed.

The short distance wireless transmitting/receiving unit 22 communicates with the short distance wireless transmitting/receiving unit 34 via the short distance wireless communication unit 21b in order to transmit and receive an audio signal by employing the short distance wireless link 40. In other words, the short distance wireless transmitting/receiving unit 22 receives both an audio signal outputted from the transmitting/receiving unit 13 and an audio signal outputted from the music reproducing unit 18 so as to encode the received audio signals. Then, the short distance wireless transmitting/receiving unit 22 stores the encoded audio signal into the transmission buffer 23. Furthermore, the short distance wireless transmitting/receiving unit 22 modulates, frequency-converts, and amplifies the audio signals stored in the transmission buffer 23 in this order of the audio signals previously stored so as to obtain a high frequency signal, and then, transmits the acquired high frequency signal to the short distance wireless communication unit 21b, and also, deletes the transmitted audio signal from the transmission buffer 23.

Also, the short distance wireless transmitting/receiving unit 22 amplifies, frequency-converts, and demodulates the high frequency signal received by the short distance wireless communication unit 21b, and then, stores the acquired encoded audio signal into the reception buffer 24. Then, the short distance wireless transmitting/receiving unit 22 decodes the audio signals stored in the reception buffer 24 in this order of the previously stored audio signal, and transmits the decoded audio signal to the transmitting/receiving unit 13, and then, deletes the transmitted audio signal from the reception buffer 24.

The encoding system related to the above-explained encoding process and decoding process corresponds to, for example, the sub-band encoding system, but the embodiment is not limited only thereto. Also, the encoding process is carried out with respect to each frame in which the audio signal is segmented in a predetermined time interval, and a predetermined number of encoded frames are collected as one RTP (Real-time Transport Protocol) packet, and then, the RTP packet is stored in the transmission buffer 23 and is transmitted. Also, the RTP packets collected in the above-described manner are received to be stored in the reception buffer 24, but the embodiment is not limited thereto.

Such an operation by which the short distance wireless transmitting/receiving unit 22 encodes the audio signal outputted from the transmitting/receiving unit 13 to store the encoded audio signal into the transmission buffer 23 and transmits the encoded audio signal to the short distance wireless communication unit 21b, and also decodes the audio signal received by the short distance wireless communication unit 21b and stored in the reception buffer 24 so as to transmit the decoded audio signal, corresponds to such a hand-free telephone communication which is executed by the hand-free apparatus 30 with respect to a mobile communication terminal (not shown) which is connected via the mobile communication terminal 10 to the mobile communication network.

On the other hand, such an operation by which the short distance wireless transmitting/receiving unit 22 encodes the audio signal outputted from the music reproducing unit 18 to store the encoded audio signal into the transmission buffer 23 and transmits the encoded audio signal to the short distance wireless communication unit 21b, corresponds to such an operation that music reproduced by the music reproducing unit 18 is produced from the speaker 37a of the hand-free apparatus 30, namely, a music player function is performed. In this case, the hand-free apparatus 30 may correspond to a headset having a structure which is mounted on a head of a user.

Next, a description is made of operations as to the respective units of the hand-free apparatus 30 with reference to FIG. 3. The input apparatus 32 is arranged by a plurality of key switches, and notifies a code signal to the control unit 31 in response to an initiation signal supplied from the control unit 31, while the code signal identifies a key switch manipulated by the user.

The short distance wireless communication unit 33b transmits a short distance wireless high frequency signal received from the short distance wireless link 40 via the antenna 33a to the short distance wireless transmitting/receiving unit 34. Also, the short distance wireless communication unit 33b transmits a high frequency signal outputted from the short distance wireless transmitting/receiving unit 34 to the short distance wireless link 40 via the antenna 33a. In this example, the short distance wireless communication system has been explained when the operations of the short distance wireless communication unit 21b have been explained.

The short distance wireless transmitting/receiving unit 34 communicates with the short distance wireless transmitting/receiving unit 22 via the short distance wireless communication unit 33b in order to transmit and receive an audio signal by employing the short distance wireless link 40. In other words, the short distance wireless transmitting/receiving unit 34 receives an audio signal outputted from the telephone communication unit 37c so as to encode the received audio signal. Then, the short distance wireless transmitting/receiving unit 34 stores the encoded audio signal into the transmission buffer 35. Furthermore, the short distance wireless transmitting/receiving unit 34 modulates, frequency-converts, and amplifies the audio signals stored in the transmission buffer 35 in this order of the audio signals previously stored to obtain a high frequency signal, and then, transmits the acquired high frequency signal to the short distance wireless communication unit 33b, and also, deletes the transmitted audio signal from the transmission buffer 35.

Also, the short distance wireless transmitting/receiving unit 34 amplifies, frequency-converts, and demodulates the high frequency signal received by the short distance wireless communication unit 33b, and then, stores the acquired encoded audio signal into the reception buffer 36. Then, the short distance wireless transmitting/receiving unit 34 decodes the audio signals stored in the reception buffer 36 in this order of the previously stored audio signal, and transmits the decoded audio signal to the telephone communication unit 37c, and then, deletes the transmitted audio signal from the reception buffer 36.

It should also be noted that the encoding technique related to the above-explained encoding process and decoding process has been explained when the operations of the short distance wireless transmitting/receiving unit 22 have been described. Also, the audio signals are transmitted and/or received in the unit of the RTP packet, which have been explained when the operations of the short distance wireless transmitting/receiving unit 22 have been described.

In the case that the previously explained hand-free telephone communication is carried out, the short distance wireless transmitting/receiving unit 34 encodes the audio signal outputted from the telephone communication unit 37c and stores the encoded audio signal into the transmissions buffer 35, and also transmits the encoded audio signal to the short distance wireless communication unit 33b, and further, decodes the audio signal which has been received by the short distance wireless communication unit 33b and has been stored in the reception buffer 36, and then, transmits the decoded audio signal to the telephone communication unit 37c. Also, in such a case that the music player function is executed, the short distance wireless transmitting/receiving unit 34 decodes the audio signal which has been received by the short distance wireless communication unit 33b and has been stored in the reception buffer 36, and then, transmits the decoded audio signal to the telephone communication unit 37c.

The telephone communication unit 37c converts the digital audio signal outputted from the short distance wireless transmitting/receiving unit 34 into an analog audio signal, and amplifies this analog audio signal so as to send the amplified analog audio signal to the speaker 37a. Also, the telephone communication unit 37c amplifies an analog audio signal outputted by the microphone 37b, and converts this amplified analog audio signal into a digital audio signal so as to transmit the converted digital audio signal to the short distance wireless transmitting/receiving unit 34. Furthermore, the telephone communication unit 37c performs an echo canceling operation in order to prevent an occurrence of howling caused by that sounds produced from the speaker 37a are inputted from the microphone 37b.

A description is made of operations of the short distance wireless transmitting/receiving unit 22 and operations of the short distance wireless transmitting/receiving unit 34 when a problem occurs in a transmission of an audio signal by the audio communication system according to the embodiment, which has been arranged as explained above. Firstly, a description is made of operations in the case that the music player function is performed, namely, in such a case that an audio signal to be transmitted corresponds to an audio signal reproduced by the music reproducing unit 18, and this audio signal is transmitted from the mobile communication terminal apparatus 10 to the hand-free apparatus 30.

Figure 4:
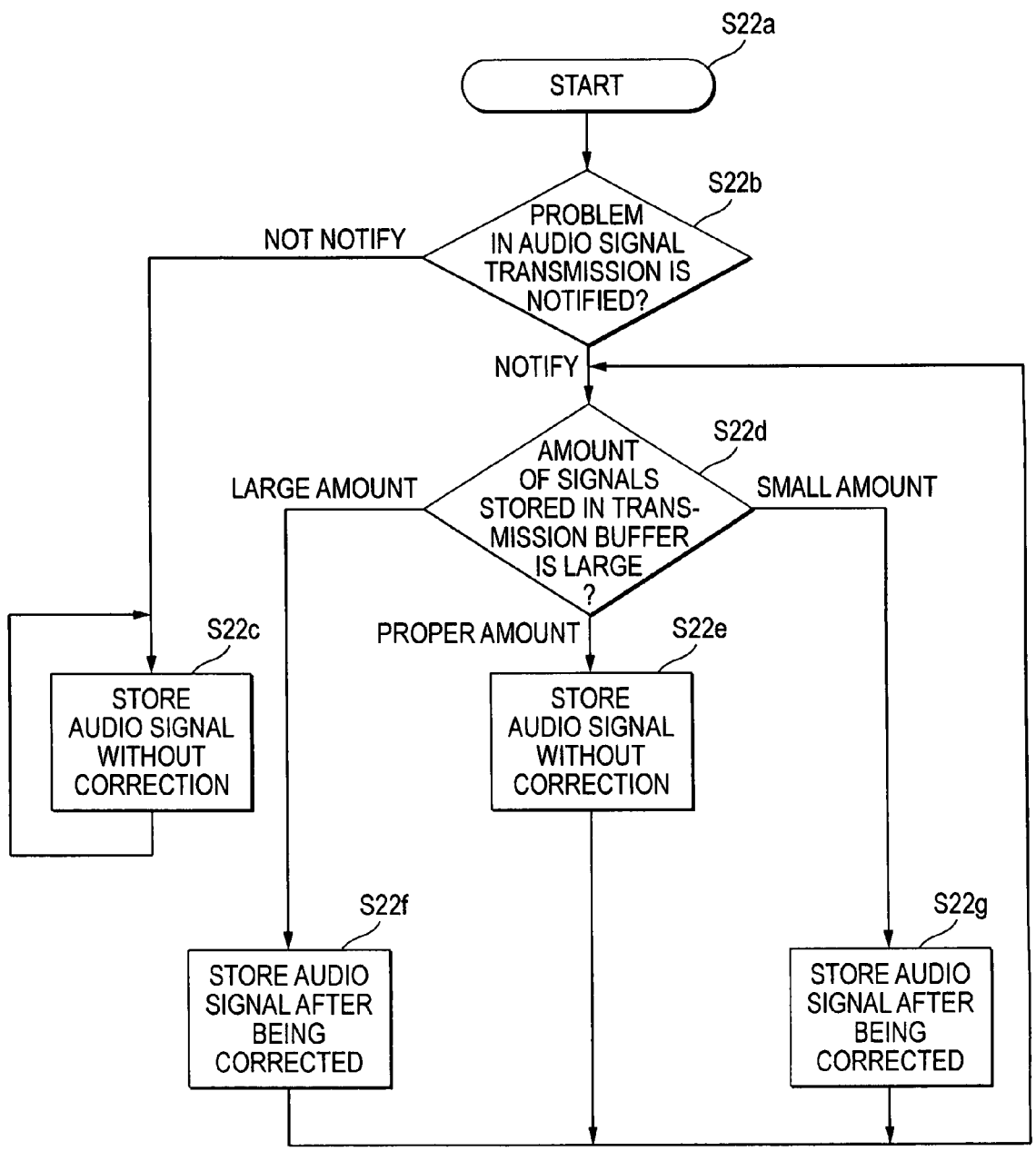
FIG. 4 is an exemplary flowchart for explaining operations as to a short distance wireless transmitting/receiving unit of the mobile communication terminal apparatus according to the embodiment.

FIG. 4 indicates a flow chart for explaining such operations that the short distance wireless transmitting/receiving unit 22 encodes an audio signal outputted from the music reproducing unit 18 and stores the encoded audio signal into the transmission buffer 23. In the flow chart, the short distance wireless transmitting/receiving unit 22 starts its operation (step S22a), and checks the below-motioned setting condition (step S22b). That is, the short distance wireless transmitting/receiving unit 22 checks as to whether or not notification is made which notifies that a problem occurs in a transmission of an audio signal in the audio communication system, which has been entered by a predetermined key operation of the input apparatus 16 and stored in the short distance wireless transmitting/receiving unit 22.

When the setting condition has been made that the problem is not notified, the short distance wireless transmitting/receiving unit 22 encodes the audio signal outputted from the music reproducing unit 18 without any correction, and stores the encoded audio signal into the transmission buffer 23 (step S22c), and then, repeatedly executes the operation of the step S22c.

While the audio signals are encoded without any correction to be stored in the step S22c, in such a case that the audio signal outputted from the music reproducing unit 18 is depleted, the short distance wireless transmitting/receiving unit 22 repeatedly stores an RTP packet finally stored in the transmission buffer 23, but the embodiment is not limited thereto. Alternatively, such an operation that the audio signal is stored in the transmission buffer 23 until an audio signal is outputted from the music reproducing unit 18 may be ceased.

On the other hand, while the audio signals are encoded without any correction to be stored, when the audio signal is stored in the transmission buffer 23, in the case that an amount of the audio signals stored in the transmission buffer 23 exceeds a storage capacity allocated to the transmission buffer 23, the short distance wireless transmitting/receiving unit 22 instructs the music reproducing unit 18 to cease the reproduction of the music contents 19a. Then, when an amount of audio signals stored in the transmission buffer 23 is reduced to a predetermined ratio of the storage capacity allocated to the transmission buffer 23, the short distance wireless transmitting/receiving unit 22 instructs the music reproducing unit 18 to restart the reproduction of the music contents 19a.

On the other hand, in the above-explained step S22b, when the setting condition has been made that the problem is notified, the short distance wireless transmitting/receiving unit 22 compares an amount of the audio signals stored in the transmission buffer 23 with the storage amount allocated to the transmission buffer 23 (step S22d). In other words, the short distance wireless transmitting/receiving unit 22 calculates a value by dividing the amount of the stored audio signals by the allocated storage capacity, and compares the calculated value with a first threshold value, and also compares the calculated value with a second threshold value which is smaller than the first threshold value. In this case, both the first threshold value and the second threshold value are larger than, or equal to 0, and are smaller than, or equal to 1.

Figure 5:
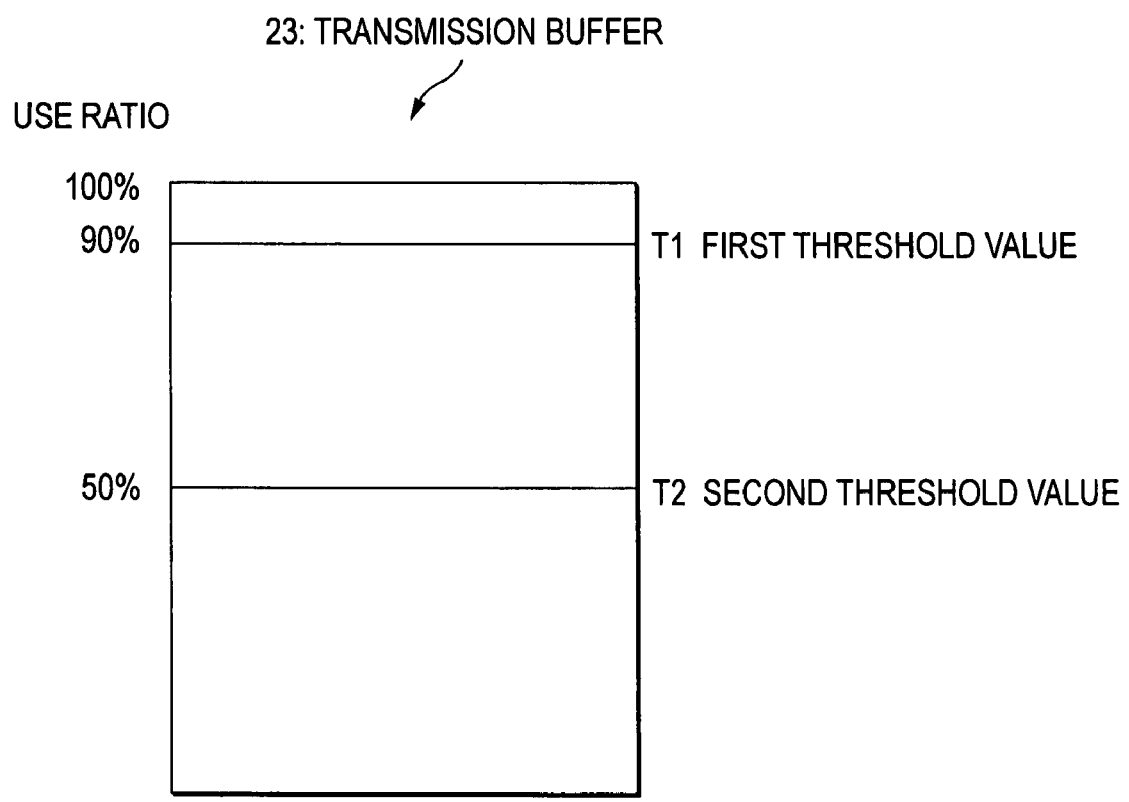
FIG. 5 is an exemplary diagram for indicating threshold values used to judge as to whether a small, or large amount of audio signals are stored in a transmission buffer of the mobile communication terminal apparatus according to the embodiment.

FIG. 5 shows one example as to the first threshold value T1 and the second threshold value T2. That is, the first threshold value T1 is 0.9 (90%), and the second threshold value T2 is 0.5 (50%). If the above-explained value is smaller than, or equal to the first threshold value T1 and further is larger than, or equal to the second threshold value T2, then the short distance wireless transmitting/receiving unit 22 judges that an amount of the audio signals stored in the transmission buffer 23 is a proper amount, and thus, there is no problem in the audio signal transmission.

Then, the short distance wireless transmitting/receiving unit 22 encodes the audio signal outputted from the music reproducing unit 18 without any correction, and stores the encoded audio signal into the transmission buffer 23 (step S22e), and then, the operation thereof is returned to a comparing operation that the amount of the audio signals stored in the transmission buffer 23 is compared with the storage capacity allocated to the transmission buffer 23 in the step S22d.

On the other hand, when the above-described value exceeds the first threshold value T1 in the step S22d, the short distance wireless transmitting/receiving unit 22 judges that the amount of the audio signals stored in the transmission buffer 23 is large and thus a problem occurs in the transmission of the audio signal. This problem corresponds to such a problem which occurs in the short distance wireless link 40 through which the communication operation is not sufficiently carried out, or corresponds to such a problem which occurs in the operations of the short distance wireless transmitting/receiving unit 22.

The problem which occurs in the operations of the short distance wireless transmitting/receiving unit 22 implies that, for instance, since sufficiently large CPU resources have not been allocated to the short distance wireless transmitting/receiving unit 22, the short distance wireless transmitting/receiving unit 22 does not properly transmit an audio signal stored in the transmission buffer 23 to the short distance wireless communication unit 21b.

The factors that the sufficiently large CPU resource is not allocated to the short distance wireless transmitting/receiving unit 22 imply that while the browser unit 17 displays a moving picture on the display unit 15, large numbers of CPU resources have been allocated to the browser unit 17; imply that while keys of the input apparatus 16 are manipulated many times per unit time, large numbers of CPU resources have been allocated to operations of the control unit 11, which correspond to these key manipulations; and the like, but the embodiment is not limited thereto.

Identifiers as to the keys manipulated many times may be transmitted to, for example, to the browser unit 17, or may be employed in order to input information which is stored in an address notebook (not shown) and may be transferred to an address notebook managing unit (not shown).

There are some cases other than the above-explained case that a problems occurs in a transmission of an audio signal, and a tempo of the audio signal is delayed at the subsequent step S22f, or step S22g, and thereafter, the problem is solved, and thus, an amount of audio signals stored in the transmission buffer 23 is increased in a transition manner.

When it is so judged that the amount of the audio signals stored in the transmission buffer 23 becomes large, the short distance wireless transmitting/receiving unit 22 corrects an audio signal outputted from the music reproducing unit 18, and encodes the corrected audio signal to store the encoded audio signal into the transmission buffer 23 (step S22f), and then the operation thereof is returned to a comparing operation that the amount of the audio signals stored in the transmission buffer 23 is compared with the storage capacity allocated to the transmission buffer 23 in the step S22d.

The correcting operation for correcting the audio signal explained in the above-explained step S22f implies that one, or plural sets of the below-mentioned correcting operations are combined with each other. Even in any of these cases, as to degrees of corrections, the larger the above-explained value becomes, the larger the correction degree becomes, but the embodiment is not limited thereto. Alternatively, the correction degree may be constant irrespective of the magnitude of the above-explained value. In this case, the correction degree corresponds to a degree of a change; large, or small times; large, or small frequencies; large, or short times; large, or small sound volumes; and the like. The correction degree may be determined, dependent upon the correction.

Firstly, as to the correction, a sound volume of an audio signal is lowered. The sound volume may be uniformly lowered with respect to entire frequency components of this audio signal, or may be different from each other, depending upon frequency components. Alternatively, such a frequency component at which a sound volume is lowered may be determined, depending up the above-explained value. Next, as the correction, a frequency of an audio signal may be corrected. Next, a tempo of an audio signal may be alternatively delayed. Next, a tempo may be alternatively quickened. When a tempo is corrected, a frequency may be corrected in connection thereto, or may not be alternatively corrected.

Next, as the correction of the audio signal, a predetermined warning sound having a predetermined time length is inserted in the audio signal, or is overlapped with the audio signal over preselected times. Next, a silent sound section is inserted in the audio signal. Next, a predetermined section of the audio signal is replaced by a silent sound section. Next, a predetermined section of the audio signal is deleted. In this case, as the section to be deleted, a silent sound section may be alternatively employed.

Further, the short distance wireless transmitting/receiving unit 22 may correct the audio signal based upon different manners in such a case that the above-explained problem corresponds to a problem occurred in the short distance wireless link 40, and in the case that the above-described problem corresponds to another problem occurred in the mobile communication terminal 10, namely in the operation of the short distance wireless transmitting/receiving unit 22. In accordance with the peration for correcting the audio signal in the different manners, the user can grasp the factor of the problem by hearing the sounds produced from the speaker 37a, so that the user can properly take measures so as to avoid the sound interruptions. In other words, the user can easily select a proper problem avoiding operation, namely, the user moves the audio transmitting apparatus and/or the audio receiving apparatus, or the user reduces a load of a program under execution in the audio transmitting apparatus.

The short distance wireless transmitting/receiving unit 22 can judge as to whether the above-explained problem corresponds to the problem occurred in the short distance wireless link 40, or the problem occurred in the operation of the mobile communication terminal 10 based upon the below-mentioned methods.

In other words, the short distance wireless transmitting/receiving unit 22 can make the judgment by receiving from the control unit 11 such an information that what percent of the CPU resources has been allocated to which processing unit by the control unit 11, and/or by receiving from the short distance wireless communication unit 21b such a ratio that RTP packets sent to the short distance wireless link 40 have been correctly transmitted by the short distance wireless communication unit 21b, namely by receiving an occurrence frequency of resending of the RTP packets from the short distance wireless communication unit 21b.

It should also be noted that in the operation of the step S22f, the short distance wireless transmitting/receiving unit 22 instructs the music reproducing unit 18 so as to cease the reproduction of the music contents 19a in addition to the above-described audio signal correction, or instead of this audio signal correction. Then, when audio signals stored in the transmission buffer 23 are reduced to the predetermined ratio of the storage capacity allocated to the transmission buffer 23, the short distance wireless transmitting/receiving unit 22 may alternatively instructs the music reproducing unit 18 so as to restart the reproduction of the music contents 19a. Also, an audio signal may not be newly stored in the transmission buffer 23, or the audio signal stored in the transmission buffer 23 may be alternatively deleted.

On the other hand, when the above-described value is smaller than the second threshold value T2 in the step S22d, the short distance wireless transmitting/receiving unit 22 judges that the amount of the audio signals stored in the transmission buffer 23 is small and thus a problem occurs in the transmission of the audio signal. This problem corresponds to such a problem which occurs in the operation of either the music reproducing unit 18 or the short distance wireless transmitting/receiving unit 22.

The problem occurred in the music reproducing unit 18 is caused by that the music reproducing unit 18 does not reproduce the music contents 19a in the proper manner. In this case, even in such a case that while the music contents 19a have been encoded, the music reproducing unit 18 is equipped with exclusively-used hardware capable of decoding the encoded music contents 19a, other portions of the music reproducing unit 18 are arranged by the CPU and the programs utilized by this CPU. As a result, when sufficiently large CPU resources have not been allocated, there are some possibilities that the operations are not carried out in a proper manner.

As a consequence, when the large number of CPU resources has been allocated to other process units of the mobile communication terminal 10, there are some possibilities that the sufficiently large CPU resources are not allocated to the music reproducing unit 18, so that the proper reproducing operation of the music contents 19a cannot be carried out. The factor why the sufficiently large CPU resources are not allocated to the music reproducing unit 18 is the same factor why the sufficiently large CPU resources are not allocated to the short distance wireless transmitting/receiving unit 22, as previously explained.

The problem occurred in the operation of the short distance wireless transmitting/receiving unit 22 implies such a case that, for example, the operations of the short distance wireless transmitting/receiving unit 22 are not properly carried out, by which the short distance wireless transmitting/receiving unit 22 encodes the audio signal outputted from the music reproducing unit 18 so as to store the encoded audio signal into the transmission buffer 23. This factor is identical to the above-explained factor why the sufficiently large CPU resources are not allocated to the music reproducing unit 18. Then, even when the short distance wireless transmitting/receiving unit 22 is equipped with exclusively-used hardware capable of encoding the audio signal, there are some possibilities that the operation thereof is not performed in a proper manner, which is similar to that of the above-explained music reproducing unit 18.

When it is so judged that the amount of the audio signals stored in the transmission buffer 23 becomes small, the short distance wireless transmitting/receiving unit 22 corrects an audio signal outputted from the music reproducing unit 18, and encodes the corrected audio signal to store the encoded audio signal into the transmission buffer 23 (step S22g), and then the operation thereof is returned to a comparing operation that the amount of the audio signals stored in the transmission buffer 23 is compared with the storage capacity allocated to the transmission buffer 23 in the step S22d.

In this case, the correction performed for the audio signal in the operation of the step S22g is such a correction which has already been described in the operation of the step S22f. It should also be noted that the correction executed in the step S22f may be made equal to that of the step S22g, or may be alternatively made equal to that of the step S22g.

Also, in the case that the amount of the audio signals stored in the transmission buffer 23 is small, and a problem occurs in the transmission of the audio signal, this problem occurs in the mobile communication terminal 10. As a consequence, it is preferable that the short distance wireless transmitting/receiving unit 22 performs in the step S22g, such a correction when the problem occurs in the mobile communication terminal 10 defined in the step S22f. This reason is given as follows: That is, the user can easily grasp the factor of this problem, and thus, can take measure capable of avoiding the sound interruptions in a proper manner.

It should also be noted that just after the short distance wireless transmitting/receiving unit 22 starts the operation, audio information has not yet been stored in the transmission buffer 23. As a consequence, the short distance wireless transmitting/receiving unit 22 may alternatively perform a different process operation from the above-described process operation only just after the above-described operation is commenced in the step S22g. For instance, the short distance wireless transmitting/receiving unit 22 may perform such an operation defined in the step S22e that the audio signal outputted from the music reproducing unit 18 is encoded without any correction, and then, the encoded audio signal is stored in the transmission buffer 23.

Since a predetermined key operation is carried out from the input apparatus 16, the short distance wireless transmitting/receiving unit 22 accomplishes the operation of the music reproducing unit 18 at an arbitrary operation step, instructs the short distance wireless transmitting/receiving unit 34 to accomplish the operation thereof, and deletes all of the audio signals stored in the transmission buffer 23 and all of the audio signals stored in the reception buffer 24, and then, accomplishes the operations (not shown).

Also, when an instruction of accomplishing the operation is received from the short distance wireless receiving unit 34, the short distance wireless transmitting/receiving unit 22 accomplishes the operation of the music reproducing unit 18, deletes all of the audio signals stored in the transmission buffer 23 and all of the audio signals stored in the reception buffer 24, and then, accomplishes the operations (not shown).

In the above description, the short distance wireless transmitting/receiving unit 22 corrects the audio signal when this audio signal is stored in the transmission buffer 23, but the embodiment is not limited thereto. Instead of the above-explained correction of the audio signal, the short distance wireless transmitting/receiving unit 22 may alternatively correct such an audio signal which has already been stored in the transmission buffer 23.

If the previously stored audio signal is corrected, then an audio signal to be transmitted to the hand-free apparatus 30 may be changed into an audio signal which has been corrected within a short time after it is so judged that the amount of the audio signals stored in the transmission buffer 23 is large, or small. As a result, such a fact that a problem occurs in a communication of an audio signal may be notified with a short time delay.

In such a case that an audio signal stored in the transmission buffer 23 has not been encoded, it is easy to correct the previously stored audio signal, as compared with another case that an audio signal stored in the transmission buffer 23 has already been encoded. As a consequence, when it is so arranged that both an audio signal before being encoded and an audio signal after being encoded are stored in the transmission buffer 23, the audio signal before being encoded may be alternatively corrected.

Figure 6:
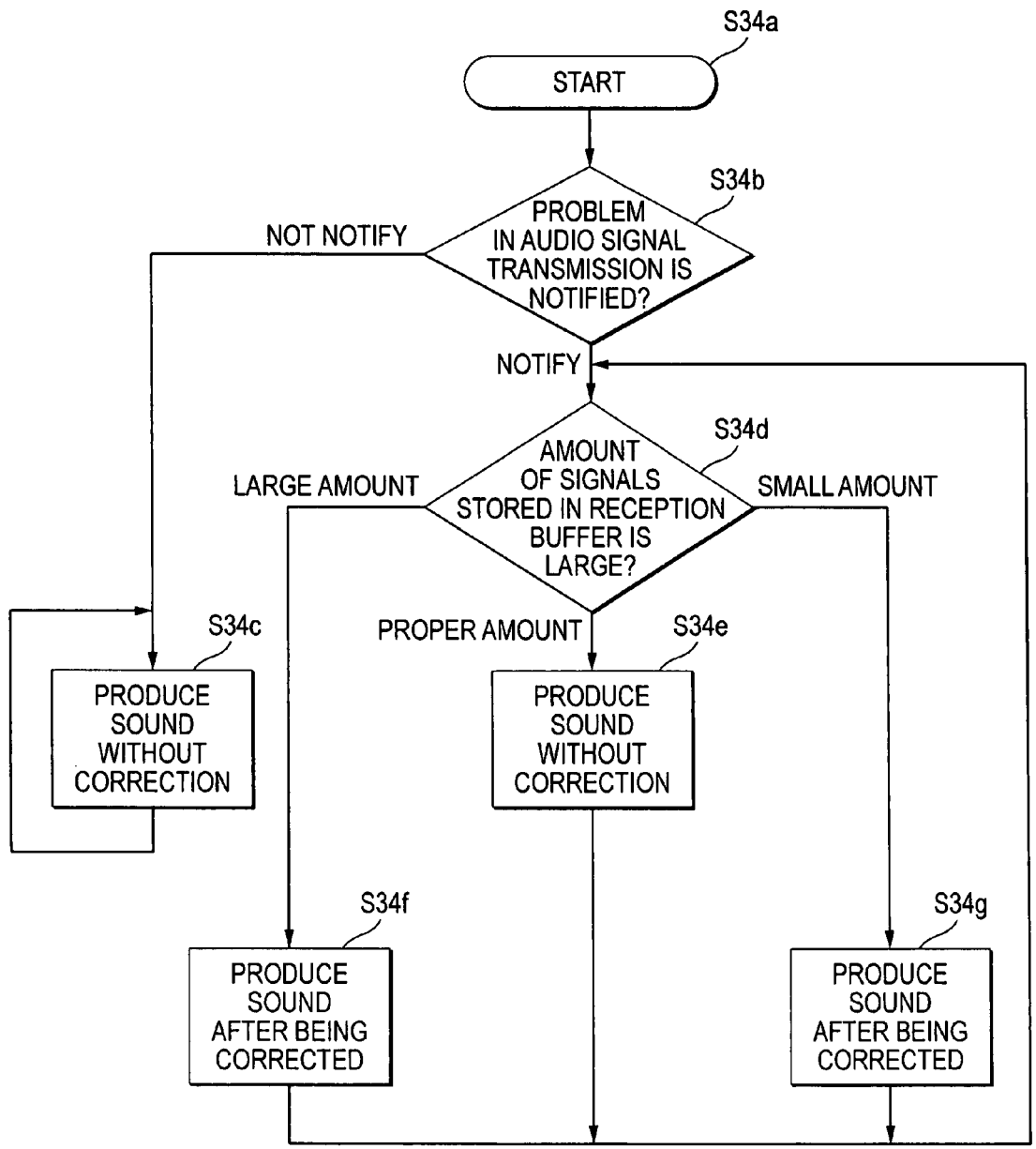
FIG. 6 is an exemplary flowchart for explaining operations as to a short distance wireless transmitting/receiving unit of the hand-free apparatus of the audio communication system according to the embodiment.

FIG. 6 is a flow chart for explaining operations of the short distance wireless transmitting/receiving unit 34 in which the short distance wireless transmitting/receiving unit 34 decodes audio signals stored in the reception buffer 36 with respect to each of RTP packets, and transfers the decoded audio signal to the telephone communication unit 37c so as to reproduce the decoded audio signal from the speaker 37a. In the flow chart, the short distance wireless transmitting/receiving unit 34 starts its operation (step S34a), and checks the below-mentioned setting condition (step S34b). That is, the short distance wireless transmitting/receiving unit 34 checks as to whether or not notification is made which notifies that a problem occurs in a transmissions of an audio signal in the audio communication system, which has been entered by a predetermined key operation of the input apparatus 32 and stored in the short distance wireless transmitting/receiving unit 34.

When the setting condition has been made that the problem is not notified, the short distance wireless transmitting/receiving unit 34 decodes the audio signal stored in the reception buffer 36, and transfers the decoded audio signal without any correction to the telephone communication unit 37c so as to produce sounds from the speaker 37a (step S34c), and then repeats the operation defined in the step S34c.

While the sounds are produced without any correction in this step, in such a case that the audio signal stored in the reception buffer 36 is depleted, the short distance wireless transmitting/receiving unit 34 repeatedly produces sounds included in an RTP packet finally received, but the embodiment is not limited thereto. Alternatively, the production of the sounds may be stopped until an audio signal is stored in the reception buffer 36.

On the other hand, while the sounds are produced without any correction, when the audio signals stored in the reception buffer 36 are approximated to the storage capacity allocated to the reception buffer 36, the short distance wireless transmitting/receiving unit 34 deletes the audio signals from the reception buffer 36, but the embodiment is not limited thereto. Alternatively, for instance, a silent sound section may be deleted.

In the above-explained operation of the step S34c, the short distance wireless transmitting/receiving unit 34 requests the short distance wireless transmitting/receiving unit 22 so as to temporarily stop the transmission of the audio signal in addition to, or instead of the above-explained correction. When audio signals stored in the reception buffer 36 are reduced to a predetermined ratio of the storage capacity allocated to the reception buffer 36, the short distance wireless transmitting/receiving unit 34 may alternatively request the short distance wireless transmitting/receiving unit 22 so as to restart the transmission of the audio signal.

On the other hand, when the setting condition has been made that the problem is notified, the short distance wireless transmitting/receiving unit 34 compares an amount of the audio signals stored in the reception buffer 36 with the storage capacity allocated to the reception buffer 36 (step S34d). In other words, the short distance wireless transmitting/receiving unit 34 calculates a value by dividing the amount of the stored audio signals by the allocated storage capacity, and compares the calculated value with a first threshold value, and also compares the calculated value with a second threshold value which is smaller than the first threshold value.

In this case, both the first threshold value and the second threshold value are those as explained in the operation of the short distance wireless transmitting/receiving unit 22. However, the first threshold value and the second threshold value may be identical to, or different from these threshold values which are employed during the operation of the short distance wireless transmitting/receiving unit 22.

If the above-explained value is smaller than, or equal to the first threshold value T1 and further is larger than, or equal to the second threshold value T2, then the short distance wireless transmitting/receiving unit 34 judges that an amount of the audio signals stored in the reception buffer 36 is a proper amount, and thus, there is no problem in the audio signal transmission. Then, the short distance wireless transmitting/receiving unit 34 decodes the audio signal stored in the reception buffer 36, and transfers the decoded audio signal without any correction to the telephone communication unit 37c so as to produce sounds from the speaker 37a (step S34e), and the operation thereof is returned to a comparing operation that the amount of the audio signals stored in the reception buffer 36 is compared with the storage capacity allocated to the reception buffer 36 in the step S34d.

On the other hand, when the above-described value exceeds the first threshold value T1 in the step S34d, the short distance wireless transmitting/receiving unit 34 judges that the amount of the audio signals stored in the reception buffer 36 is large and thus a problem occurs in the transmission of the audio signal. This problem corresponds to such a problem which occurs in the operation of the short distance wireless transmitting/receiving unit 34. The problem occurred in the operation of the short distance wireless transmitting/receiving unit 34 corresponds to the following problem. That is, for example, such a CPU resource has not been allocated by which the short distance wireless transmitting/receiving unit 34 decodes the audio signal stored in the reception buffer 36, and transfers the decoded audio signal to the telephone communication unit 37c so as to produce sounds from the speaker 37a.

When it is so judged that the amount of the audio signals stored in the reception buffer 36 becomes large, the short distance wireless transmitting/receiving unit 34 decodes the audio signal stored in the reception buffer 36, and transfers the decoded audio signal to the telephone communication unit 37c so as to produce sounds from the speaker 37a (step S34f), and the process operation thereof is returned to a comparing operation that the amount of the audio signals stored in the reception buffer 36 is compared with the storage capacity allocated to the reception buffer 36 in the step S34d.

In this case, the correction performed with respect to the audio signal explained in the step S34f corresponds to such a correction as explained in the operation of the short distance wireless transmitting/receiving unit 22 defined in the step S22f. It should also be understood that the correction performed in the step S22f may be identical to, or different from the correction executed in the step S34f.

In the above-explained operation of the step S34f, the short distance wireless transmitting/receiving unit 34 requests the short distance wireless transmitting/receiving unit 22 so as to temporarily stop the transmission of the audio signal in addition to, or instead of the above-explained correction. When audio signals stored in the reception buffer 36 are reduced to a predetermined ratio of the storage capacity allocated to the reception buffer 36, the short distance wireless transmitting/receiving unit 34 may alternatively request the short distance wireless transmitting/receiving unit 22 so as to restart the transmission of the audio signal.

As apparent from the arrangement of the hand-free apparatus 30 shown in FIG. 3, the functions which are processed by the hand-free apparatus 30 are limited. As a consequence, there is a small possibility that the sufficiently large CPU resources have not been allocated to the short distance wireless transmitting/receiving unit 34. Accordingly, the short distance wireless transmitting/receiving unit 34 may alternatively perform the operation of the step S34e, instead of the operation defined in the step S34f.

On the other hand, when the above-described value is smaller than the second threshold value T2 in the step S34d, the short distance wireless transmitting/receiving unit 34 judges that the amount of the audio signals stored in the reception buffer 36 is small and thus a problem occurs in the transmission of the audio signal. This problem corresponds to such a problem which occurs in the operation of the short distance wireless link 40. This problem implies that the communication operation is not sufficiently carried out via the link 40, or corresponds to such a problem occurred in the operation of the mobile communication terminal 10. This reason is given as follows: That is, as previously explained, there is a small possibility that such sufficiently large CPU resources are not allocated to the short distance wireless transmitting/receiving unit 34 which stores the audio signal received by the short distance wireless communication unit 33*b* into the reception buffer 36.

If the short distance wireless transmitting/receiving unit 34 judges that the amount of the audio signals stored in the reception buffer 36 is small, then the short distance wireless transmitting/receiving unit 34 decodes the audio signal stored in the reception buffer 36 and corrects the decoded audio signal, and transfers the decoded audio signal with the correction to the telephone communication unit 37*c* so as to produce sounds from the speaker 37*a* (step S34*g*), and the process operation thereof is returned to such a comparing operation that an amount of the audio signals stored in the reception buffer 36 is compared with the storage amount allocated to the reception buffer 36 in the step S34*d*.

In this case, the correction performed with respect to the audio signal explained in the step S34*g* corresponds to such a correction as explained in the operation defined in the step S34*f*. It should also be understood that the correction performed in the step S34*g* may be identical to, or different from the correction executed in the step S34*f*.

Alternatively, the correction performed for the audio signal in the operation of the step S34*g* may be made equal to such a correction which is executed by the short distance wireless transmitting/receiving unit 22 of the mobile communication terminal 10 when the problem occurs in the short distance wireless link 40. In accordance with this process operation, there is a small risk that confusion may be conducted by the user, since the different correction is added when the problem occurs in the short distance wireless link 40.

In such a case that a problem happens to occur in the short distance wireless communication network 40, or the short distance wireless transmitting/receiving unit 22, and an amount of the audio signals stored in the reception buffer 36 is small, it is conceivable that the amount of the audio signals stored in the transmission buffer 23 of the mobile communication terminal 10 is large. As a result, in this case, since the audio signal to be transmitted to the hand-free apparatus 30 has been corrected by the short distance wireless transmitting/receiving unit 22 of the mobile communication terminal 10, the short distance wireless transmitting/receiving unit 34 may alternatively execute the operation of the step S34*e* instead of the operation of the step S34*g*.

Also, in the case that a problem happens to occur in the short distance wireless link 40, or the short distance wireless transmitting/receiving unit 22, and an amount of the audio signals stored in the transmission buffer 23 is large, the short distance wireless transmitting/receiving unit 22 of the mobile communication terminal 10 may not correct the audio signal. In accordance with these operations, it is possible to avoid that the audio signal are corrected in an overlap manner by the short distance wireless transmitting/receiving unit 22 and the short distance wireless transmitting/receiving unit 34.

On the other hand, when a problem happens to occur in the short distance wireless link 40, or the short distance wireless transmitting/receiving unit 22, and an amount of the audio signals stored in the transmission buffer 23 is large, in the case that the short distance wireless transmitting/receiving unit 22 does not correct such an audio signal whose encoding operation has already been ended, the short distance wireless transmitting/receiving unit 34 corrects the audio signal, so that it is possible to notify that the problem occurs in the short distance wireless link 40 with a short time delay.

While the audio signal of the step S34*g* is corrected to produce the sound, when the audio signal stored in the reception buffer 36 is depleted, the short distance wireless transmitting/receiving unit 34 repeatedly produces sounds included in the finally received RTP packet, but the embodiment is not limited thereto. Alternatively, the production of the sounds may be ceased until the audio signal is stored in the reception buffer 36.

After the short distance wireless transmitting/receiving unit 34 starts the operation, audio information has not yet been stored in the reception buffer 36. As a consequence, the short distance wireless transmitting/receiving unit 34 may alternatively perform a different process operation in the step S34*g* only just after the above-described operation is commenced. For instance, the short distance wireless transmitting/receiving unit 34 may perform such an operation that the sounds caused by the audio signal stored in the reception buffer 36 are not produced.

Since a predetermined key operation is carried out from the input apparatus 32, the short distance wireless transmitting/receiving unit 34 accomplishes the operation of the short distance wireless transmitting/receiving unit 22 at an arbitrary operation step, and deletes all of the audio signals stored in the transmission buffer 35 and all of the audio signals stored in the reception buffer 36, and then, accomplishes the operations (not shown).

Also, when an instruction of accomplishing the operation is received from the short distance wireless receiving unit 22, the short distance wireless transmitting/receiving unit 34 deletes all of the audio signals stored in the transmission buffer 23 and all of the audio signals stored in the reception buffer 24, and then, accomplishes the operations (not shown).

Next, a description is made of both operations of the short distance wireless transmitting/receiving unit 22 and operations of the short distance wireless transmitting/receiving unit 34 when a problem occurs in a transmission of an audio signal by the audio communication according to the embodiment in such a case that an audio signal to be transmitted is such an audio signal received by the transmitting/receiving unit 13. This operation corresponds to such a case that while a hand-free telephone communication operation is carried out and a telephone communication operation is carried out via a base station by the mobile communication terminal 10, a received telephone audio signal is transmitted via the short distance wireless link 40 to the hand-free apparatus 30.

The operations executed in the case that this received telephone audio signal is transmitted is substantially identical to those of the case that the above-explained music player function is performed. Accordingly, only different points will be explained. Firstly, in the operations defined in the above-described steps S22*c* and S22*f*, there is no meaning that the short distance wireless transmitting/receiving unit 22 instructs the music reproducing unit 18 when audio signals stored in the transmission buffer 23 exceed a predetermined amount, but also cannot instruct the transmitting/receiving unit 13 so as to cease the transmission of the audio signal. This reason is given as follows: That is, since the transmitting/receiving unit 13 performs the telephone communication process operation, an actual time process operation is required in order to transmit and receive a signal.

Next, in the operations defined in the above-explained steps S34*c* and S34*f*, it is not possible that the short distance wireless transmitting/receiving unit 34 instruct the transmitting/receiving unit 13 so as to temporarily cease the transmission of the audio signal in such a case that audio signals stored in the reception buffer 36 exceed a predetermined amount. This reason has already been explained above.

Next, a description is made of both operations of the short distance wireless transmitting/receiving unit 22 and operations of the short distance wireless transmitting/receiving unit 34 when a problem occurs in a transmission of an audio signal by the audio communication according to the embodiment in such a case that an audio signal to be transmitted is such an audio signal transmitted from the telephone communication unit 37c. This operation corresponds to such a case that while a hand-free telephone communication operation is carried out and a telephone communication operation is carried out via a base station by the mobile communication terminal 10, a transmitting telephone audio signal is transmitted via the short distance wireless link 40 from the hand-free apparatus 30.

The operation when this transmitting telephone audio signal is transmitted from the hand-free apparatus 30 is similar to the operation when the received telephone audio signal is transmitted via the short distance wireless link 40 to the hand-free apparatus 30, although the directions along which the audio signals are transmitted are different from each other. Accordingly, the below-mentioned correspondence relationship is given as follows: That is to say, in the latter case, the short distance wireless transmitting/receiving unit 22 corrects, or does not correct the audio signal stored in the transmission buffer 23 with reference to the amount of the audio signals stored in the transmission buffer 23. In the former case, the short distance wireless transmitting/receiving unit 34 corrects, or does not correct the audio signal stored in the reception buffer 36 with reference to the amount of the audio signals stored in the transmission buffer 35.

Also, in the latter case, the short distance wireless transmitting/receiving unit 34 corrects, or does not correct the audio signal stored in the reception buffer 36 with reference to the amount of the audio signals stored in the reception buffer 36. In the former case, the short distance wireless transmitting/receiving unit 22 corrects, or does not correct the audio signal stored in the transmission buffer 23 with reference to the amount of the audio signals stored in the reception buffer 36.

In the above explanations, such a corresponding relationship that the short distance wireless transmitting/receiving unit 22 does not correct the audio signal stored in the reception buffer 24, and also, the short distance wireless transmitting/receiving unit 34 does not correct the audio signal stored in the transmission buffer 35 does not constitute a mere corresponding relationship. This is because when the problem occurs in the audio signal transmission by the audio communication system, the audio signal which is transmitted from the mobile communication terminal 10 to the hand-free apparatus 30 is continuously corrected.

This reason is given as follows: That is, since the audio signal transmitted from the hand-free apparatus 30 to the mobile communication terminal 10 corresponds to the transmitting telephone audio signal, the correction performed with respect to this audio signal is not known by the users of these apparatuses, but also, the effect of embodiment cannot be achieved. Alternatively, the transmitting telephone audio signal may be corrected, and such a fact that the problem occurs in the audio signal transmission of the audio communication system may be notified to the telephone communication counter party. If this notification is sent to the communication counter party, then this communication counter party may grasp the occurrence of the problem, and may take such a measure that an important item is repeatedly transmitted.

In the case that the hand-free telephone communication process operation is carried out, both operation in which the received telephone audio signal is transmitted from the mobile communication terminal 10 via the short distance wireless link 40 to the hand-free apparatus 30, and another operation in which the transmitting telephone audio signal is transmitted from the hand-free apparatus 30 via the short distance wireless link 40 to the mobile communication terminal 10 are carried out at the same time. As a consequence, the above-described process operation for the received telephone audio signal and the above-explained operation for the transmitting telephone audio signal are carried out at the same time by both the short distance wireless transmitting/receiving units 22 and 34.

In the above descriptions, the audio signals which are stored in the transmission buffer 23, the reception buffer 24, the transmission buffer 35, and the reception buffer 36, have been encoded, but the embodiment is not limited thereto. Alternatively, these audio signals may be stored before being encoded, or decoded audio signals may be stored. In any of these cases, both the short distance wireless transmitting/receiving unit 22 and the short distance wireless transmitting/receiving unit 34 may grasp that the problem occurs based upon such a value which is calculated by dividing an amount of audio signals stored in each of these transmission and reception buffers by a storage capacity allocated to each of these buffers.

Also, the short distance wireless transmitting/receiving unit 22 and the short distance wireless transmitting/receiving unit 34 may alternatively judge as to whether or not a problem occurs in the short distance wireless link 40 with reference to a communication condition of the short distance wireless link 40 under which audio signals are transmitted and received between the mobile communication terminal 10 and the hand-free apparatus 30 in addition to the amount of the audio signals stored in the above-described buffer, or instead thereof.

A condition of a communication is communicated by employing, for instance, the RTP control protocol (RTCP). The communication condition communicated by employing the RTP control protocol corresponds to a total number of packet resending operations, time duration after an RTP packet is transmitted from one apparatus until this RTP packet is received by another apparatus, and the like.

Also, in the above descriptions, the music reproducing unit 18 reproduces an audio signal stored in the music contents 19a, but the embodiment is not limited only thereto. Alternatively, while the music contents 19a may include picture information, the music reproducing unit 18 may display a picture signal on the display unit 15 in addition to the reproduction of the audio signal. In this alternative case, the picture signal is transmitted from the short distance wireless transmitting/receiving unit 22 to the short distance wireless transmitting/receiving unit 34 in connection with the audio signal. During this signal transmission, both the audio signal and the picture signal are encoded by employing the MPEG-4 system, but the embodiment is not limited only thereto.

In the above-explanations, the music player function corresponds to such a function that the music contents 19a reproduced by the music reproducing unit 18 are produced from the speaker 37a. As another example, in such a case that music contents are streaming-reproduced which are transmitted from a server apparatus (not shown) connected to a mobile communication network so as to be reproduced from the speaker 37a, both the short distance wireless transmitting/receiving units 22 and 34 perform the same process operations as those executed in such a case that a telephone communication of the hand-free telephone communication is produced from the speaker 37a. This reason is given as follows: That is, the short distance wireless transmitting/receiving units 22 and 34 cannot instruct the server apparatus to cease the transmission of the music contents and to reproduce the music contents.

Although an audio signal does not clearly indicate either a monophonic signal or a stereophonic signal in the above-explained description, this audio signal may correspond to any one of these signals. It should also be noted that when the stereophonic signals are produced from the speaker 37a, this speaker 37a is made of two sets of speakers. The embodiment is not limited only to the above-described arrangement, but may be modified in various manners.

According to the above-embodiments, both the audio transmitting apparatus and the mobile communication terminal can be provided, which notify such a possibility that the audio communication is interrupted by the audio communicated by the audio communication.

What is claimed is:

1. An audio transmitting apparatus connectable to an audio playing apparatus via a short distance wireless communication network, comprising:
   a transmission buffer configured to store an audio signal; and
   a short distance wireless transmitting unit configured to cause the audio signal to be stored in the transmission buffer, or transmit the audio signal stored in the transmission buffer to the audio playing apparatus,
   wherein, when a transmission process in which the audio signal is transmitted to the audio playing apparatus by the short distance wireless transmitting unit is interrupted, the short distance wireless transmitting unit corrects the audio signal and stores the corrected audio signal in the transmission buffer, or corrects the audio signal stored in the transmission buffer and transmits the corrected audio signal to the audio playing apparatus,
   wherein a value is calculated by dividing an amount of the audio signal stored in the transmission buffer by a storage capacity allocated to the transmission buffer, and
   wherein, when the calculated value is larger than a first threshold value, the short distance wireless transmitting unit judges that the transmission process is interrupted.

2. The audio transmitting apparatus according to claim 1, wherein, when the calculated value is smaller than a second threshold value that is smaller than the first threshold value, the short distance wireless transmitting unit judges that the transmission process is interrupted.

3. The audio transmitting apparatus according to claim 1, further comprising:
   a music playing unit configured to play music; and
   a content storage unit configured to store a music content, wherein the audio signal corresponds to the music content played by the music playing unit.

4. The audio transmitting apparatus according to claim 1, wherein the short distance wireless transmitting unit corrects the audio signal by delaying a tempo of the audio signal.

5. The audio transmitting apparatus according to claim 1, wherein the short distance wireless transmitting unit corrects the audio signal by decreasing a sound volume of the audio signal.

6. A mobile communication terminal having a first communication unit communicating with a base station, and a second communication unit communicating with a hand-free terminal via a short-distance communication, said mobile communication terminal comprising:
   a storage unit configured to store a music content that is downloaded via the first communication unit;
   a buffer unit configured to temporarily store data;
   a reading unit configured to read out the music content stored in the storage unit and to cause the buffer unit to store the read music content; and
   a transmission unit configured to compare a data amount of the music content stored in the buffer unit with a predetermined reference value, wherein the transmission unit is configured to transmit the music content stored in the buffer unit via the second communication unit to the hand-free terminal when the data amount of the music content satisfies the predetermined reference value, and
   wherein the transmission unit is configured to transmit the music content stored in the buffer unit via the second communication unit to the hand-free terminal after correcting the music content stored in the buffer unit when the data amount of the music content does not satisfy the predetermined reference value.

7. The mobile communication terminal according to claim 6, wherein the transmission unit corrects the music content by changing a sound volume of the music content.

8. A mobile communication terminal having a first communication unit communicating with a base station, and a second communication unit communicating with a hand-free terminal via a short-distance communication, said mobile communication terminal comprising:
   a storage unit configured to store a music content that is downloaded via the first communication unit;
   a buffer unit configured to temporarily store data;
   a reading unit configured to read out the music content stored in the storage unit and to cause the buffer unit to store the read music content;
   a correction unit configured to compare a data amount of the music content stored in the buffer unit with a predetermined reference value and to re-store the music content in the buffer unit after correcting the music content when the data amount of the music content does not satisfy the predetermined reference value; and
   a transmission unit configured to transmit the music content stored in the buffer unit via the second communication unit to the hand-free terminal.

9. The mobile communication terminal according to claim 8, wherein the transmission unit corrects the music content by changing a sound volume of the music content.

10. The audio transmitting apparatus according to claim 1, wherein the short distance wireless transmitting unit corrects the audio signal by inserting a warning sound in the audio signal.

11. The audio transmitting apparatus according to claim 1, wherein the short distance wireless transmitting unit corrects the audio signal by overlapping a warning sound with the audio signal.

12. The mobile communication terminal according to claim 6, wherein the transmission unit corrects the music content by inserting a warning sound in the music content.

13. The mobile communication terminal according to claim 6, wherein the transmission unit corrects the music content by overlapping a warning sound with the music content.

14. The mobile communication terminal according to claim 8, wherein the transmission unit corrects the music content by inserting a warning sound in the music content.

15. The mobile communication terminal according to claim 8, wherein the transmission unit corrects the music content by overlapping a warning sound with the music content.

* * * * *